United States Patent
Yan et al.

(10) Patent No.: US 9,894,170 B2
(45) Date of Patent: Feb. 13, 2018

(54) SOCIAL MEDIA WITH MULTI-LEVEL RELATIONSHIPS

(71) Applicant: SUCCESSFACTORS, INC., South San Francisco, CA (US)

(72) Inventors: Xiaozhi Yan, Shanghai (CN); Yue Peter Zhao, Shanghai (CN)

(73) Assignee: SUCCESSFACTORS, INC., South San Francisco, CA (US)

( * ) Notice: Subject to any disclaimer, the term of this patent is extended or adjusted under 35 U.S.C. 154(b) by 230 days.

(21) Appl. No.: 14/576,172

(22) Filed: Dec. 18, 2014

(65) Prior Publication Data

US 2016/0182659 A1    Jun. 23, 2016

(51) Int. Cl.
*G06F 15/16*    (2006.01)
*H04L 29/08*    (2006.01)
*G06F 3/0482*    (2013.01)
*G06Q 50/00*    (2012.01)
*G06T 11/20*    (2006.01)

(52) U.S. Cl.
CPC ............ *H04L 67/22* (2013.01); *G06F 3/0482* (2013.01); *G06Q 50/01* (2013.01); *G06T 11/206* (2013.01)

(58) Field of Classification Search
CPC ... G06Q 10/10; H04L 29/06; H04L 29/08072; H04L 29/06027
USPC ......................................................... 709/204
See application file for complete search history.

(56) References Cited

U.S. PATENT DOCUMENTS

| | | | |
|---|---|---|---|
| 2005/0246420 A1* | 11/2005 | Little, II | G06Q 10/107 709/204 |
| 2012/0144317 A1* | 6/2012 | Balasubramanian | H04L 67/24 715/751 |
| 2014/0316941 A1* | 10/2014 | Mekala | G06Q 30/0613 705/26.41 |

* cited by examiner

*Primary Examiner* — Alan S Chou
(74) *Attorney, Agent, or Firm* — Fountainhead Law Group P.C.

(57) ABSTRACT

Disclosed herein is a framework for customizing multiple levels of relationships between entities in a social media network. In accordance with one aspect, n number of levels of entities related to a user of an account in the social media network may be defined with a multi-level entities module, and a list of entities in relationship to the user from level 1 to n may be determined, where level 1 entities are in a direct relationship to the user, level i entities are in a direct relationship with level i−1 entities, where i is from 1 to n, and entities in level 2 to n are in an indirect relationship to the user. The entities list may then be displayed to the user.

17 Claims, 13 Drawing Sheets

| User | Direct Friends |
|---|---|
| A | a |
| B | a, b |
| C | b, c |
| a | A, B |
| b | B, C |
| c | C |

SOCIAL MEDIA WITH MULTI-LEVEL RELATIONSHIPS

TECHNICAL FIELD

The present disclosure relates generally to social media platforms. In particular, the present disclosure relates to social media having multi-level relationships.

BACKGROUND

Numerous social platforms currently exist. Social platforms, for example, enable people to interact, such as create, share, exchange and comment on contents among members or users in virtual communities. Social media platforms are basically based on a user's relationships. The relationships of a user may be referred to as friends, relationships or connections. For example, a user's information may be shared among friends of that user.

In conventional social platforms, a user may only have access to information of the user's friends. In other words, social platforms are based on the relationship of direct friends. Such social platforms limit the ability of sharing information only with direct friends. Furthermore, a relationship is only established when a user connects with another user. This further limits the ability of a user making friends or connections with people outside of his or her direct friends circle.

It is therefore desirable to provide a social media platform with improved social connectivity, such as sharing information and facilitating new relationships.

SUMMARY

Disclosed herein is a framework for customizing multiple levels of relationships between entities in a social media network. In accordance with one aspect, n number of levels of entities related to a user of an account in the social media network may be defined with a multi-level entities module, and a list of entities in relationship to the user from level 1 to n may be determined, where level 1 entities are in a direct relationship to the user, level i entities are in a direct relationship with level i−1 entities, where i is from 1 to n, and entities in level 2 to n are in an indirect relationship to the user. The entities list may then be displayed to the user.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

A framework or application for improved social connectivity is described herein. The framework may be used, for example, to provide access to multi-level relationships between entities in various social media platforms such as, for example, social network portals, professional networking sites, commercial sites, and information sharing platforms (e.g., forums). Entities, for example, may include individual persons or groups of people. Other types of entities may also be useful. In accordance with one aspect, the framework facilitates multiple levels of relationships between the entities in various social scenarios such as commercial activities, networking, socializing, such as meeting of new friends (e.g., indirect friends of a user), between the entities. The multiple levels of relationships between the entities may include direct and indirect relationships. In addition, the framework provides a user with wider access to information based on his or her relationships with other entities. Further, the relationships of a user are customizable as will be described in more detail herein. For ease of discussion, the present framework and examples may be described in the context of friends who are related to a user, including directly and indirectly related friends. However, it is to be understood that the framework may be applied to relationships between other types of entities in a social platform.

Figure 1:
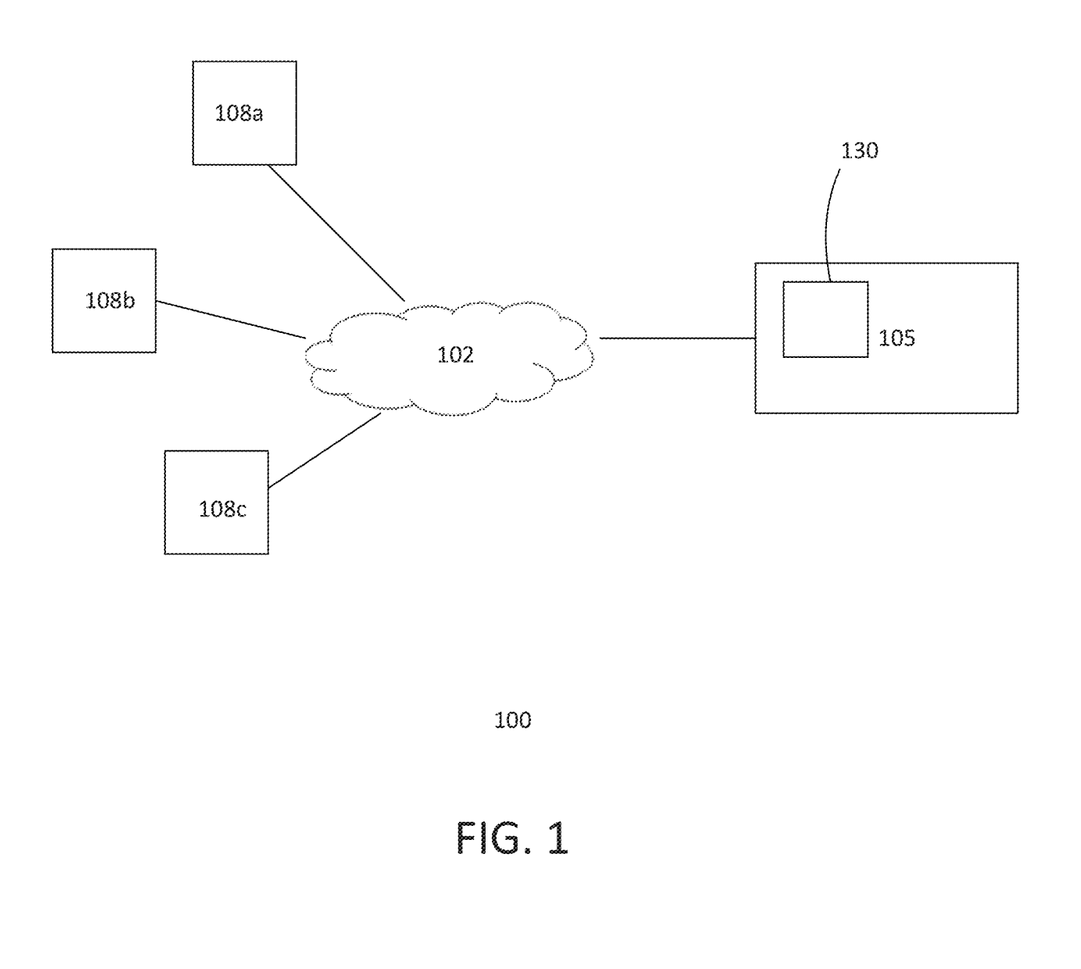
FIG. 1 shows an embodiment of a framework environment.

FIG. 1 shows a simplified diagram of an exemplary environment or architecture 100. Environment 100 may have a distributed architecture. In one implementation, the environment includes a cloud 102. The environment, for example, includes a cloud computing environment. The cloud, for example, includes a server 105.

A server may include one or more computers. A computer includes a memory and a processor. Various types of computers may be employed for the server. For example, the computer may be a mainframe, a workstation, as well as other types of processing devices. The memory of a computer may include any memory or database module. The memory may be volatile or non-volatile types of non-transitory computer-readable media, such as magnetic media, optical media, random access memory (RAM), read-only memory (ROM), removable media, or any other suitable local or remote memory component. The computers of a server are connected through a communication network, such as internet, intranet, local area network (LAN), wide area network (WAN) or a combination thereof. The servers, for example, are part of the same private network. The servers of the cloud may be located in a single or multiple locations.

In one implementation, the server includes a social media platform or portal 130. For example, the social media platform resides on the server in the cloud. The social media platform includes accounts for users. Information of user accounts is stored, for example, in the servers. In one implementation, the social media platform includes a database for storing information of user accounts. The database, for example, is a High-Performance Analytic Appliance (HANA) database from SAP SE. Other types of databases may also be useful. The server may include other applications. In one implementation, the social media platform includes a multi-level entities or relationships module. The multi-level entities module enables a subscriber or user of the platform to view multiple levels of entities or relationships. For example, entities which have direct and indirect relationship to the user can be viewed.

The server may be accessed by users 108a-c. Although the environment is shown with three end-users, it is understood that there may be any number of end-users accessing the server. Users may access the server by using end-user devices. An end-user device may be a local computing device with, for example, a local memory and a processor. The memory may be volatile or non-volatile types of non-transitory computer-readable media, such as magnetic media, optical media, random access memory (RAM), read-only memory (ROM), removable media, or any other suitable local or remote memory component. Various types of processing devices may serve as an end-user device. For example, the end-user device may be a PC, a tablet PC, a workstation, a network computer, a kiosk or a mobile computing device, such as a laptop, a tab or a smart phone. Other types of processing devices may also be used. End-user and end-user device may be used interchangeably. For example, when referring to an end-user, it is understood that the end-user connects to the server using a web browser or other software run-time platform (such as Microsoft.NET, Adobe AIR, Android SDK platform, iOS SDK platform and etc.) on various operating systems from the end-user device.

Access to the server may be through the internet. The access or connection to the server may be using a mobile telecommunication network, such as a 4G network. Other types of connections to the server may also be useful. For example, the connection may be through a cable or ISDN connection. An end-user may access the server using an account. For example, an end-user or subscriber may access the social media platform by logging onto a user account through a mobile application or a web browser.

Figure 2:
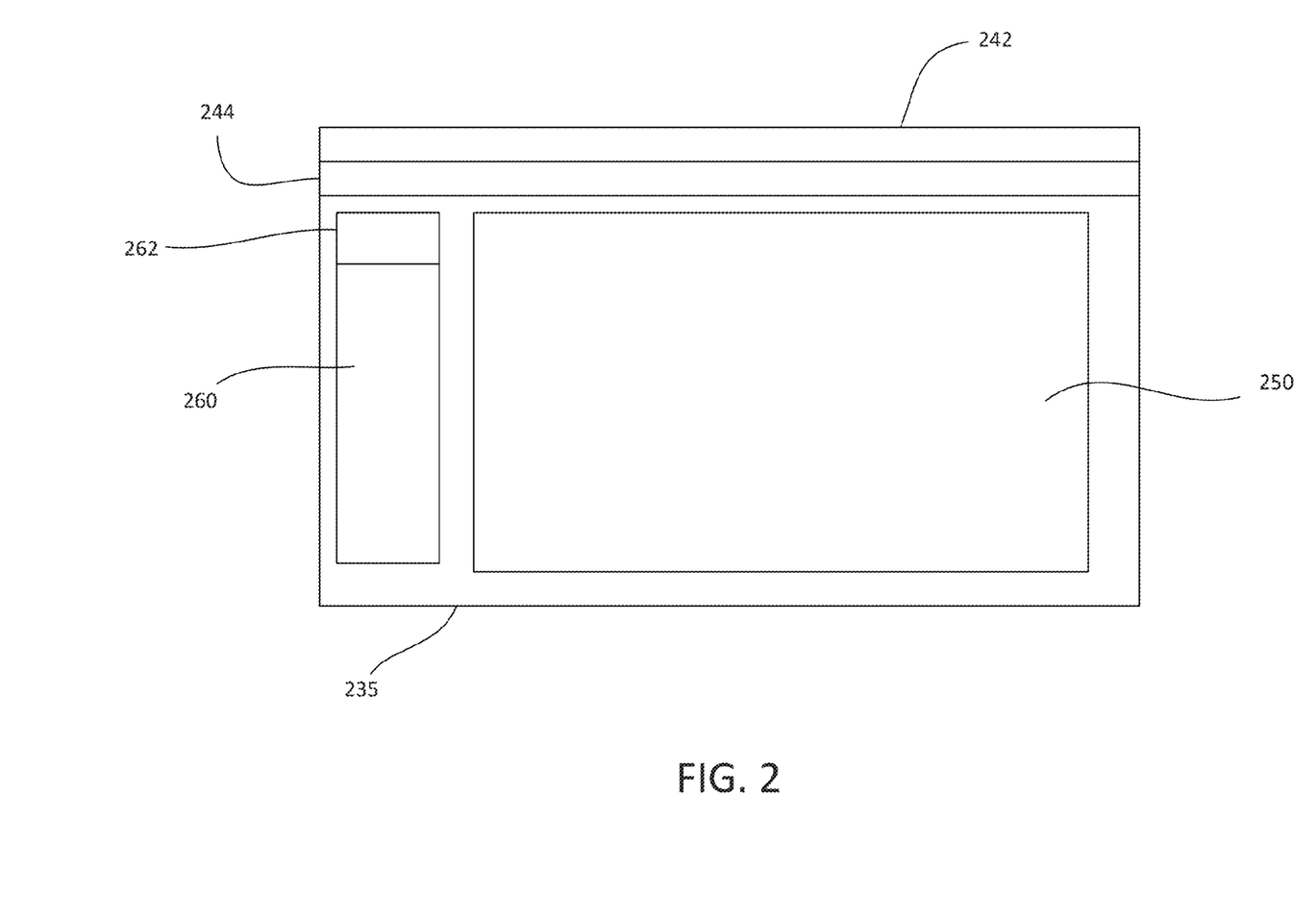
FIG. 2 shows a simplified implementation of a home page of a social media platform.

FIG. 2 shows a simplified social media platform home page 235 when accessed using an end-user device. The home page, for example, may be accessed by a user using a mobile application or an internet browser. Other techniques for accessing the social media platform may also be useful. For example, a user logs onto the social media platform using a user name and password.

As shown, the page includes a title page 242, indicating the social media platform. A menu bar 244 is provided to facilitate navigating the social media platform. The menu bar may include drop down menus of different functions and commands. A tool bar (not shown) may also be useful. The quick tool bar may be customized by the user to include commands or functions in the menu bar. The home page may include entities panel such as a friends panel 260. The friends panel may provide a list of friends of the user. In one implementation, the social media platform includes a multi-level entities module or function. The multi-level function provides a user the ability to view multiple levels of entities that are related to the user. For example, the user may view multiple levels of friends, such as direct and indirect friends that are related to the user. The social media platform may provide a default number of levels of friends to view. For example, the default value may be three. Other default values may also be useful. The page may include a level selection function 262. A user may select a desired level using the level selection function. For example, the selection function may be used to override the platform's default level value. The page may include a content view panel 250. The view panel may view contents of the user. The user may select which contents to view, for example, using the menu bar or tool bar.

As described, the multi-level entities module of the social media platform, enables a user to view multiple levels of friends. For example, the social media platform enables a user to view n levels of friends (or entities), where n is ≥1. For example, in the case of n=1 which is the base level, direct friends of the user are shown. In the case where n>1, indirect levels of friends are also shown. The platform may display a default number of levels or a user may select the desired number of levels of friends to view. As the number gets higher, the greater indirect levels of friends are shown.

Figure 3:
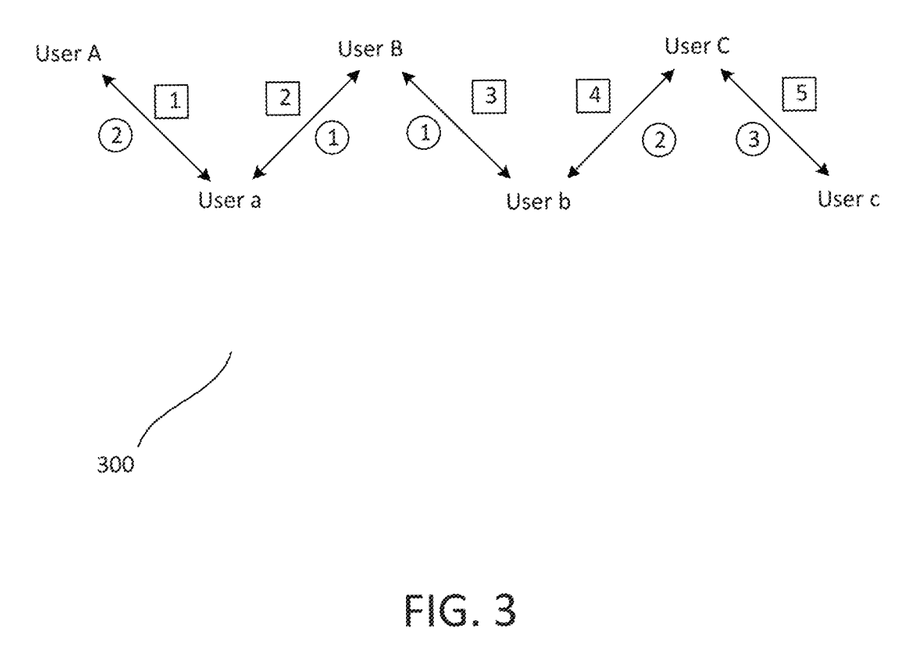
FIG. 3 shows an example of relationships between entities in a social media network.

FIG. 3 shows an example of relationships between entities 300 in a social media network. The social network includes, for example, six users. The users are user A, user a, user B, user b, user C and user c. A direct relationship of a user is indicated by an arrow. For example, user A has a direct relationship with user a, user b has a direct relationship with user B, user B have direct relationship with user a and so on. As shown, relationships of user A has 5 levels of friends, with the levels indicated by numbers in a square. For example, the first level includes user a, second level includes user B, third level includes user b, fourth level includes C and the fifth level includes user c. User B, on the other hand has 3 levels of friends, with the levels indicated by the numbers in a circle. For example, level 1 friends includes user a and user b, level 2 friends includes user A and user C while level 3 friends includes user c.

Figure 4A:
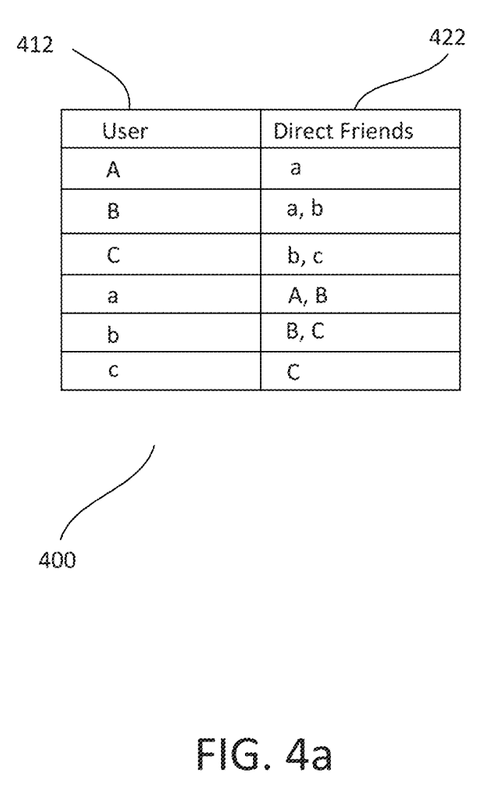
FIG. 4a shows an implementation of a database table.

FIG. 4a shows an implementation of a database table 400. In one implementation, the table contains relationships between entities of a social network. The database table, for example, may be stored in a database, such as a HANA database from SAP SE. Other types of databases may also be useful. The social network includes users and relationships as described in FIG. 3. As shown, the table includes first and second columns 412 and 422. The first columns stores users and the second columns stores entities which are in direct relationship to the users such as, for example, direct friends of the users. Providing other number of columns containing other user information may also be useful.

Using a recursive or loop process, the different levels of entities for all users can be easily determined from the database table. The recursive process may obtain entities in relationship to a user level-by-level. For example, in the case of a three level relationship, a first loop obtains friends in the first level, a second loop obtains the second level friends, which is friends of each friend in the first level, and a third loop obtains the third level friends, which is friends of each friend in the second level. The number of loop depends on the number of levels. For example, the number of loop is equal to the number of levels. In the case of 3 levels, three loops are performed.

Figure 4B:
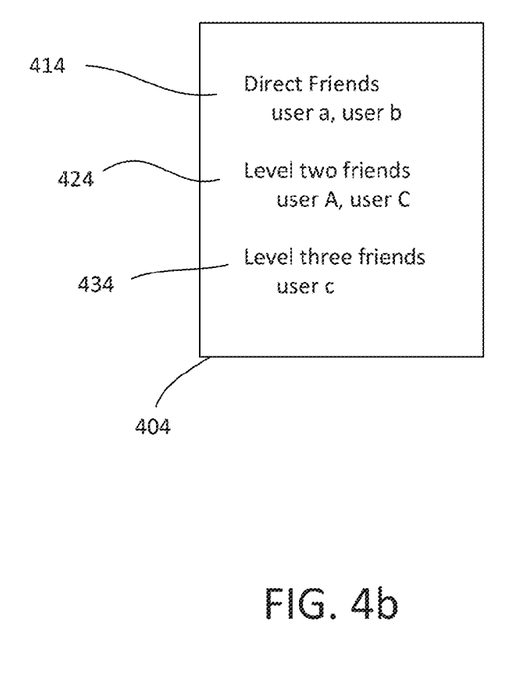
FIG. 4b shows an example of a display of a friends list.

The list of friends may be stored in an entities list (e.g., friends list), level-by-level. The friends in the friends list may be displayed level-by-level. FIG. 4b shows an example of a display 404 of a friends list, level-by-level. The friends list corresponds to friends list for user B in FIG. 3. As shown, level one (direct) friends may be displayed in the level one grouping 414, level two friends may be displayed in the level two grouping 424 and level three friends may be displayed in the level three grouping 434.

Figure 4C:
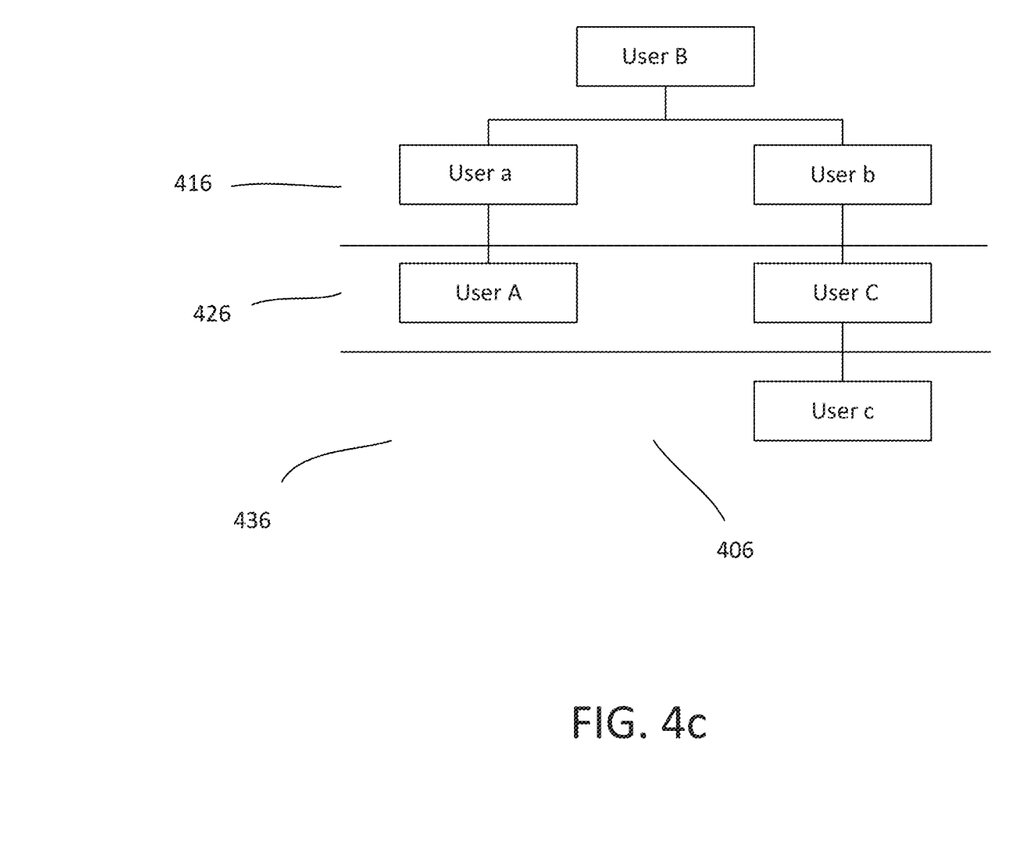
FIG. 4c shows another example of a display of a friends list.

FIG. 4c shows an example of a display 406 of a friends list. As shown, the friends list is displayed as a tree-structure. The friends list corresponds to friends list for user B in FIG. 3. As shown, level one (direct) friends may be displayed in the level one grouping 416, level two friends may be displayed in the level two grouping 426 and level three friends may be displayed in the level three grouping 436. The tree-structure indicates from which friend each connection originates. Other formats of displaying friends of a friends list may also be useful. For example, the friends may be depicted graphically with connections to denote friends and levels.

Pseudo code of an implementation of a recursive process or routine is provided below:

```
UserList getFriendListByLevel (User centerUser, int levelNumber){
    UserList friendList = new UserList( );
    friendList.add(centerUser);
    while(levelNumber > 0){
        UserList nextLevelFriends = new nextLevelFriends( )
        foreach(User user in friendList){
            nextLevelFriends.add(user.friends);
        }
        friendList.add(nextLevelFriends);
        levelNumber--;
    }
    Return friendList;
}
```

The routine processes inputs for centerUser and levelNumber. The centerUser refers to the user of the account and levelNumber refers to the level of friends (or entities) to display for centerUser. As discussed, levelNumber may be based on a default level number or one which is customized or specified by the user. The process generates an output friendList. The output provides a list of friends (or entities) of centerUser, level by level, based on the input levelNumber.

As an example, centerUser is User A and levelNumber is equal to 3. The routine adds User A to the friendList and performs three loops. A loop retrieves next level of friends for each friend in the current level and adds them to the list in the next level. For example, the first loop will find direct or level 1 friends of User A and add them to the friendList as level 1 friends. Assume that User A has two direct friends, User B1 and User B2, the friendList will store User B1 and User B2 as level 1 friends of User A. The levelNumber is then decremented, resulting in levelNumber being equal to 2. Since levelNumber is greater than 0, the loop is repeated to retrieve level 2 friends, which are direct friends of User B1 and User B2. The level 2 friends are stored in the friendList as level 2 friends of User A. The levelNumber is then decremented, resulting in levelNumber being equal to 1. Since levelNumber is greater than 0, the loop is repeated to retrieve level 3 friends, which are direct friends of level 2 friends of User A. The level 3 friends are stored in the friendList as level 2 friends of User A. The levelNumber is then decremented, resulting in levelNumber being equal to 0. Since levelNumber is not greater than 0, the routine is terminated, resulting in the friendList containing Level 1, Level 2 and Level 3 friends of User A.

In one implementation, information related to relationship of the previous level is maintained in the list. For example, if a user D2 at level 3 is a direct friend of a user C2 at level 2, this information is included in the friendList. Including information of relationships to previous level enables a user to view the lineage of the friends (or entities).

Figure 4D:
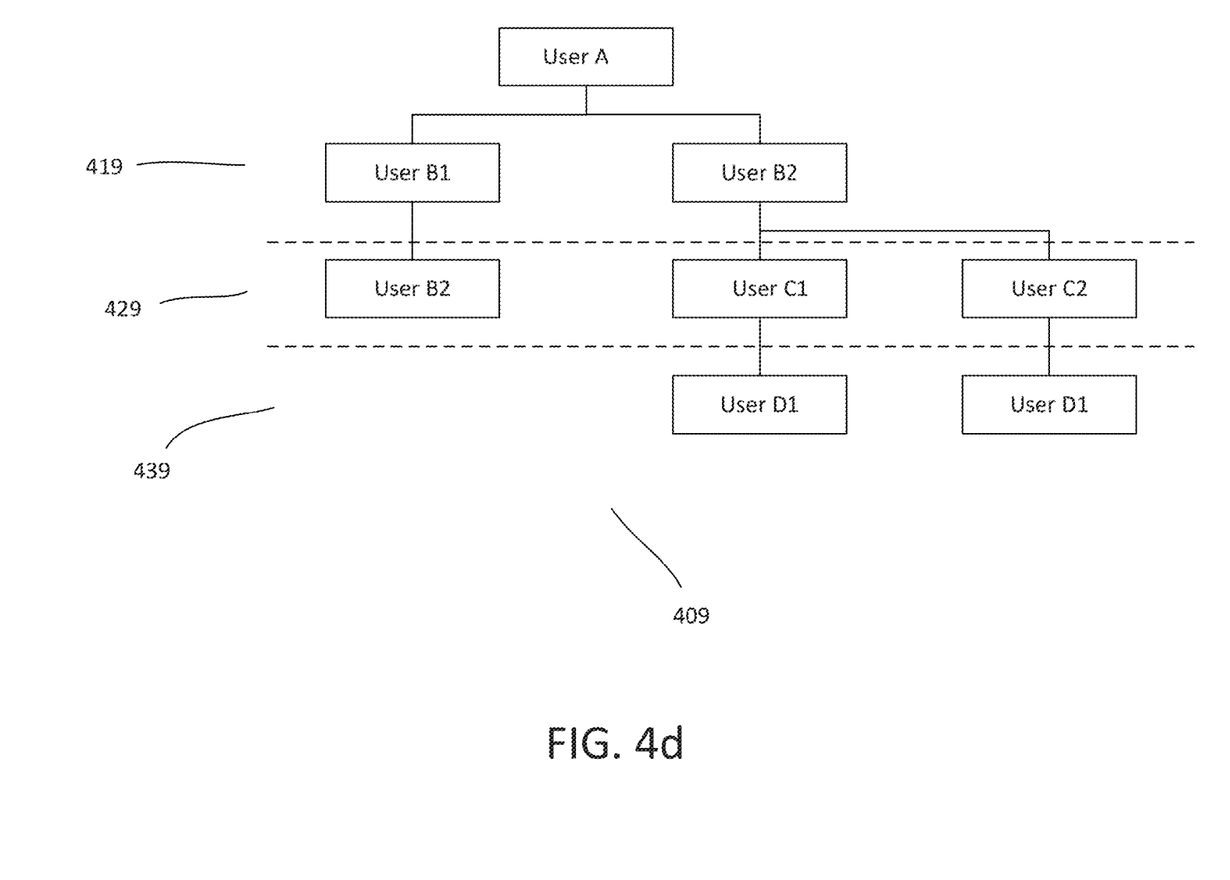
FIG. 4d illustrates a scenario where a friend may be listed multiple times.

There may be instances that a friend may be listed multiple number of times in the friendList. FIG. 4d illustrates a scenario where a friend may be listed multiple times. A tree structure 409 with three levels of friends of User A is shown. The first level 419 includes User B1 and User B2. User B1 has, as a direct friend User B2 while User B2 has direct friends User C1 and User C2. As such, the second level 429 includes User B2, User C1 and User C2. However, B2 is already included in the first level as a direct friend of User A. As for the third level 439, it includes User D1 as a direct friend of User C1, and User D1 as a direct friend of User C2. Again, User D1 appears twice in level 3.

In one implementation, redundant friends are not included in the friendList. For example, when next level friends are retrieved, they are compared to determine that there are no matches within the level. If there are friends which are the same (e.g., same people and same up-level friend), extraneous ones are removed, leaving only one remaining in the list. The results in next level friends list contain unique friends. The next level friends list is compared with the existing friendList to ensure that there are no matches with friends from previously retrieved (higher) levels. If there are matches, the common friend in the next level friends list is removed. Friends in the next level friends list is then stored in the friendList. The pseudo code may be modified to include comparison steps to remove common friends to produce a friendList with unique friends.

Figure 4E:
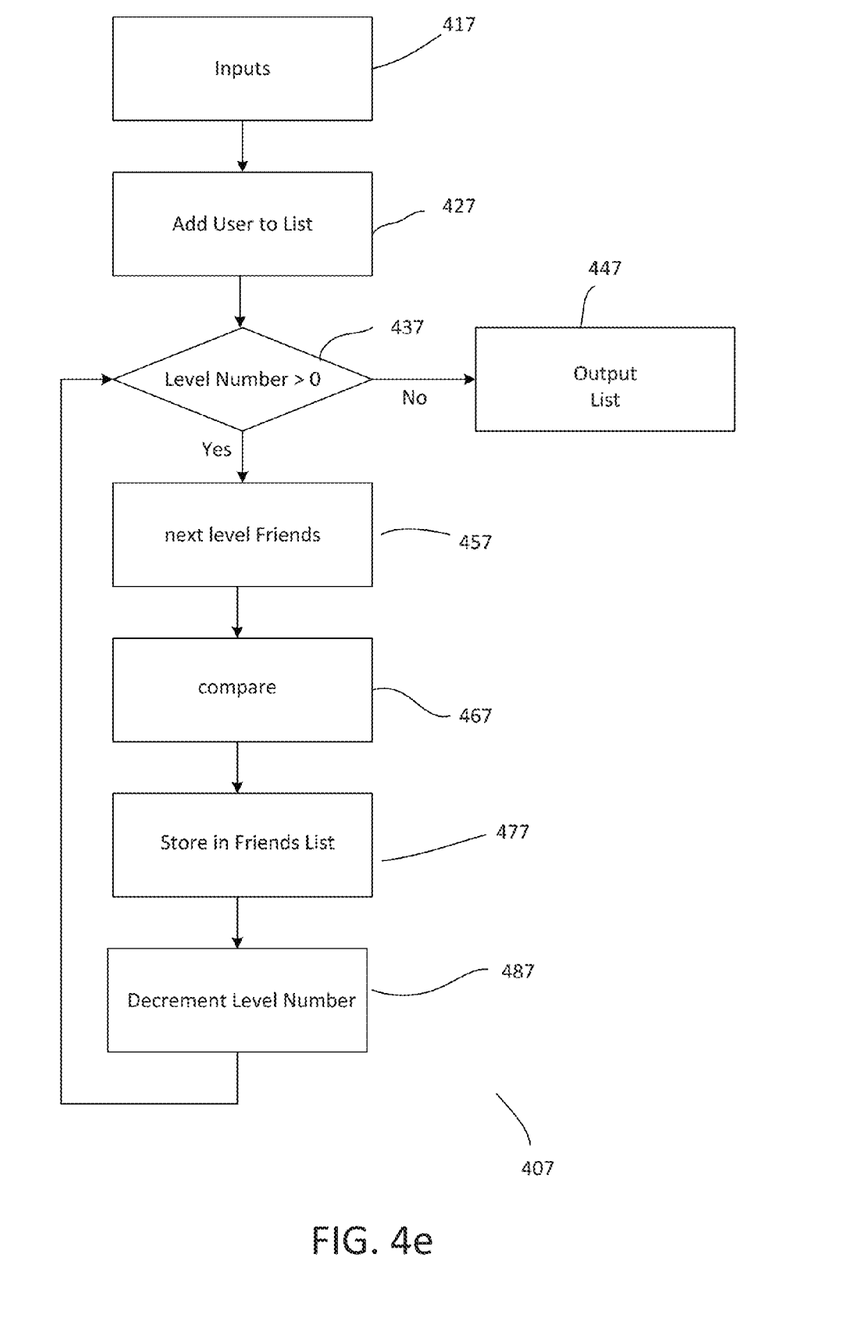
FIG. 4e shows an implementation of a process flow for retrieving multi-level entities that are in relationship to a user.

FIG. 4e shows an implementation of a process flow 407 for retrieving multi-level entities (e.g., friends) that are in relationship to a user. At step 417, inputs are received. The inputs include, for example, centerUser and levelNumber. The centerUser refers to the user of the account and levelNumber refers to the level of friends to display for centerUser. As discussed, levelNumber may be based on a default level number or one which is customized or specified by the user. The process, at step 427, adds centerUser to the friendList. The process determines if levelNumber is greater than 0 at step 437. If levelNumber is greater than 0, the process continues to step 457. At 457, the process retrieves next level friends for each friend in the friendList. For example, next level friends are provided as a next level friends list.

In one implementation, friends in the next level friends list are processed at step 467 so that there are only unique friends in the next level friends list. For example, the next level friends list is compared with friends in the friendList. Common friends are removed from the next level friends list. The friends in the processed next level friends list are added to the friendList as next level friends at step 477. The friendList contains unique friends. Other processes to produce a friendList with unique friends may also be useful.

At step 487, the processes decrements levelNumber by 1 and loops back to step 437. If levelNumber is greater than 0, the process continues to step 457. On the other hand, if levelNumber is equal to 0, the process outputs the friendList and terminates. As described, the friendList contains a list of unique friends of centerUser, level-by-level. The friendList is displayed to the user. Providing a list of unique friends avoids providing redundant information to the user.

Figure 5:
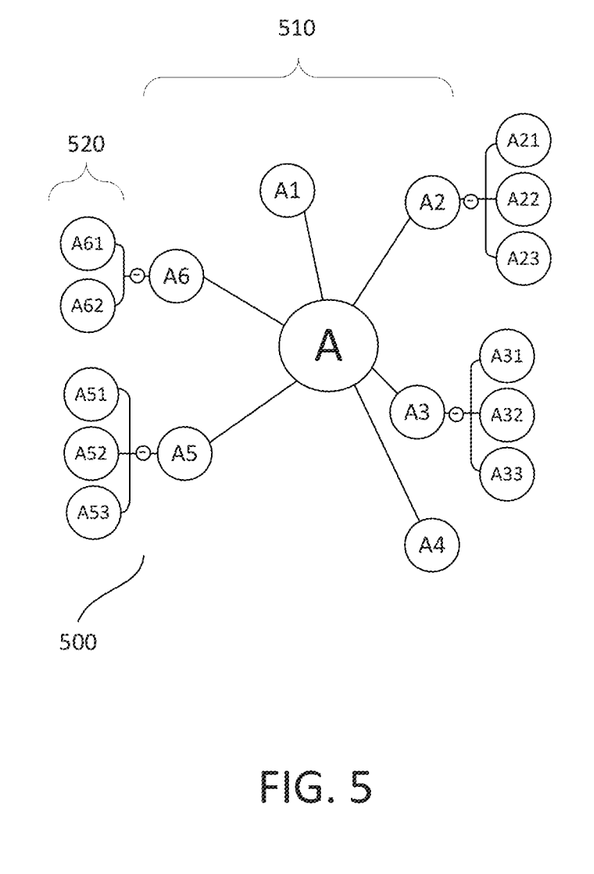
FIG. 5 shows a graphical model or representation of two levels of entities.

FIG. 5 shows a graphical model or representation 500 of two levels of entities (n=2). Entities in direct relationship to user A include users A1, A2, A3, A4, A5 and A6. For example, direct friends of user A corresponds to the first level 510 of friends. The direct friends correspond to level 1 or base level of friends of user A. A second level 520 shows friends of direct friends of user A. For example, level 2 show indirect friends of user A. The friends in level 2 are direct friends of level 1 friends of user A. For example, friends A61 and A62 are direct friends of first level friend A6. By viewing two levels of friends, user A views a total of 17 friends, 11 more compared to that of only one level.

Figure 6:
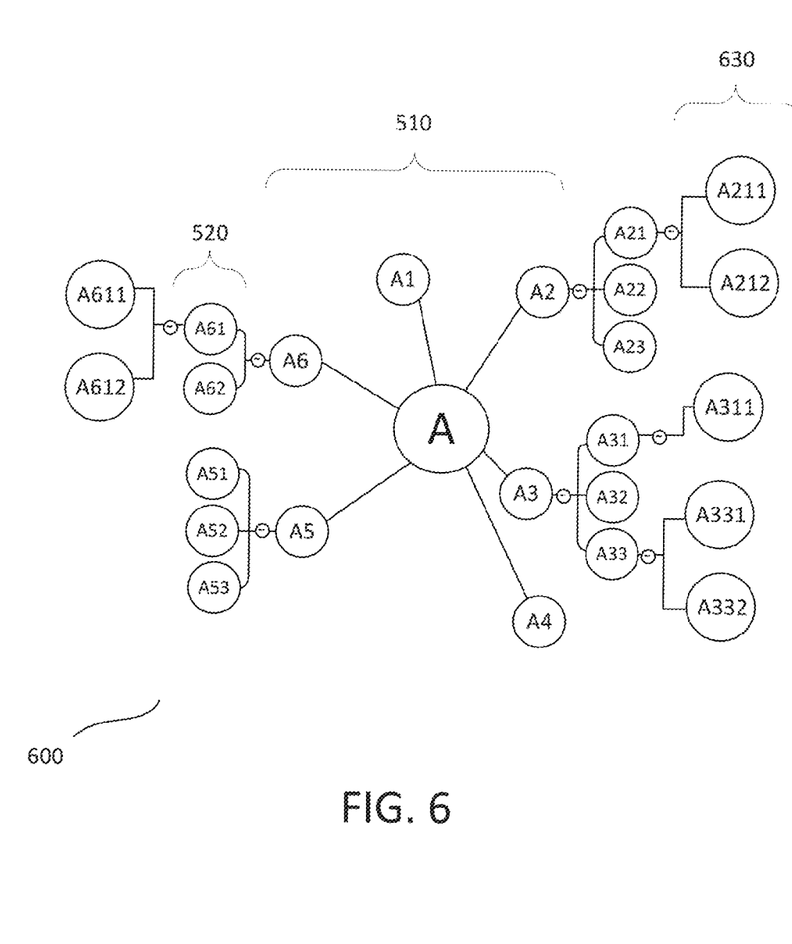
FIG. 6 shows a graphical model or representation of three levels of entities.

FIG. 6 shows a graphical model or representation 600 of three levels of entities (n=3). The first level 510 and second level 520 are similar to that as described in FIG. 5. In addition, a third level of friends 630 is shown. The friends in the third level are direct friends of level 2 friends. For example, friends A611 and A612 are direct friends of second level friend A61. By viewing three levels of friends, user A views a total of 24 friends, 7 more compared to that of two levels and 18 more compared to that of only one level.

In one implementation, the multi-level entities module includes various filtering function to reduce the amount of content viewed by a user. For example, content, such as information, topic or feedback posted by entities in relationship to the user are reduced by reducing the number of entities from which content is viewed. In one implementation, the entities list, e.g., friendList, which is viewed by the user remains the same. However, content are viewed from a sub-set of the friends due to filtering. In other words, content from a selected group of friends from the friends list is viewed by the user while content from remaining friends (e.g., un-selected group of friends) is not displayed to the user. By leaving the friends list unchanged, a user may select a friend from the unselected group of friends to view content therefrom. This may be achieved by, for example, clicking on a friend from the unselected group.

In one implementation, filtering function may include a level reduction filtering function. Level reduction filtering includes showing content from a percentage of entities at each level. The percentage of entities whose content is shown at each level may be provided as default percentages provided by the multi-level entities module. In one implementation, the percentages are graduated percentages. For example, the percentage of selected friends decreases with each additional level. In one implementation, selected friends from level 1 friends may be 100%, selected friends from level 2 friends may be 50% while selected friends from level 3 friends may be 25%. For example, with each additional level, the percentage of selected friends is decreased by 50% of the previous level. Providing other percentages of selected friends at the different friends levels may also be useful.

In one implementation, the multi-level entities module may include a default value for level reduction filtering. In one implementation, the default value is 100% for level 1 and with each additional level, the percentage of selected friends is decreased by 50% of the previous level. Other default values for level reduction filtering may also be useful. Additionally, a user may specify or customized the percentage of selected entities at each level. Other configurations of level reduction filtering may also be useful.

An example of a pseudo code for a level reduction filtering routine is provided below:

```
Double getPercentageByLevel(int levelNumber){
    Double percentage = 1;
    for(int i=1; i<levelNumber; i++){
        percentage = percentage * 0.5;
    }
    return percentage;
}
```

The routine processes inputs for levelNumber, which is the level and outputs the percentage for that level. As shown, the routine reduces the percentage of selected entities in the previous (lower) level by 50% for the current (higher) level.

Figure 7:
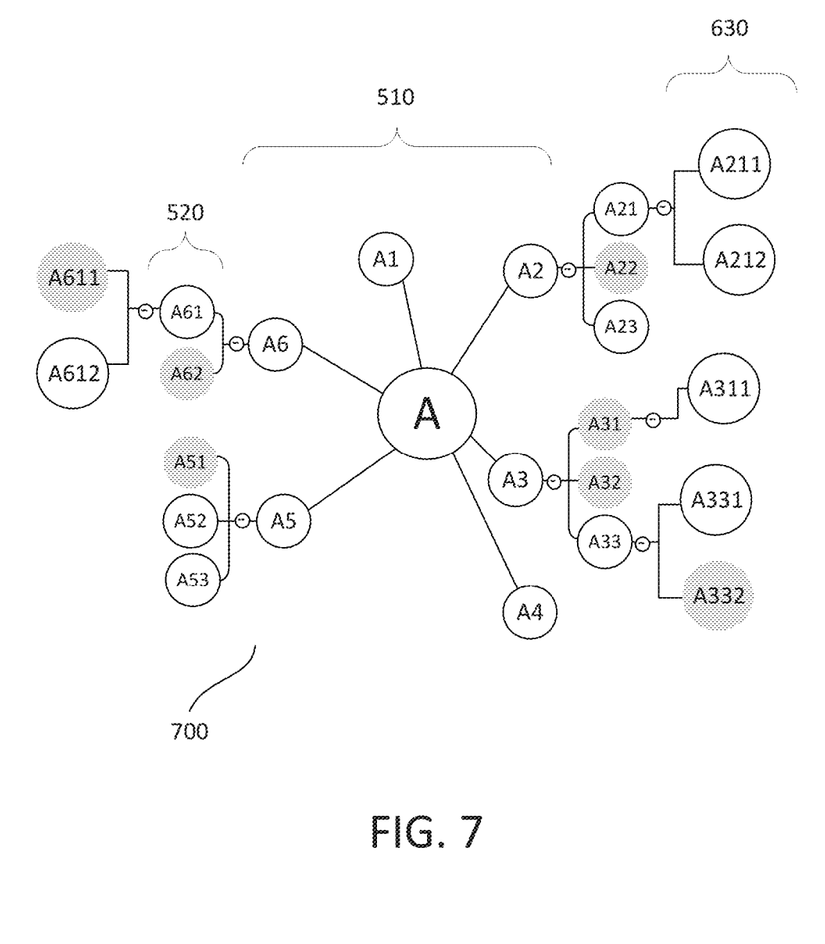
FIG. 7 shows an exemplary graphical model or representation of three levels of entities with level reduction filtering.

FIG. 7 shows an exemplary graphical model or representation 700 of three levels of entities (n=3) with level reduction filtering. As shown, level reduction filtering reduces each incremental level of selected friends by 50% of the previous level, with a starting value of 100% for level 1. This results in selected friends at level 1 being 100%, selected friends at level 2 being 50% and selected friends at level 3 being 25%. The module may randomly select the friends at each level. Other techniques for selecting friends may also be useful. Friends which are in highlighted in grey represent unselected friends. For example, unselected friends will not have their information, such as topic or feedback, displayed. In the event where the percentages do not result in a whole number, it is rounded up to the next higher whole number. For example, in level 2, 50% of 11 is 5.5, so the selected number of friends is rounded up to 6 out of 11. Similarly in level 3, number of selected friends is rounded up to 2. Rounding down to the lower whole number may also be useful.

In some cases, filtering may include tag filtering. In tag filtering, only friends with the selected tag may have their content displayed (or viewed). For example, a user may select friends with a "computer science tag". In such cases, only those friends with computer science tags are selected friends.

Figure 8:
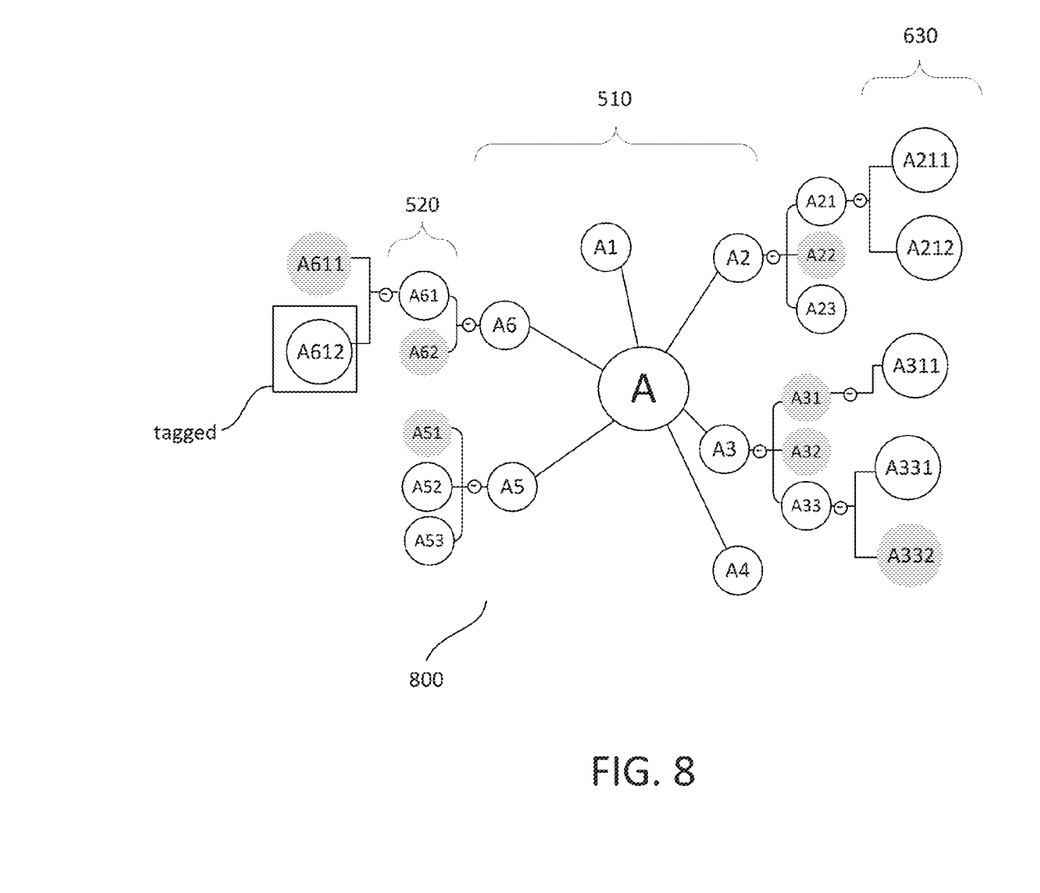
FIG. 8 shows an example of level reduction filtering and tag filtering.

The multi-level entities module may include one or more of the filtering functions described. Furthermore, more than one filtering functions may be selected. For example, level reduction and tag filtering functions may both be selected. FIG. 8 shows an example of level reduction filtering of FIG. 7 and tag filtering 800. User A612 of selected friends from level reduction filtering includes the selected tag. As such only user A612 is a selected friend out of all the friends in the friendList based on level reduction and tag filtering. In one implementation, when multiple filtering is employed, selected friends are those which are part of the intersect group of selected friends from the different filtering processes. For example, there may be additional friends in the friendList having the selected tag, but are not selected due to level reduction filtering. In other cases, selected friends may be from the union of the selected friends from the different filtering processes. The module may have a default choice between the intersect and union options. In addition, the module may allow the user to select the desired option.

In one implementation, the module may include distance feature. This feature enables a user to determine distance of the relationship between any two entities, including the user. In one implementation, the distance feature determines if the relationship between two entities exceeds a threshold or maximum distance. The distance is measured by units of 1. The distance feature may be used in conjunction with filtering options. For example, selection of entities may be given preference to those with a distance less than a threshold distance or maximum distance to the user. Other uses of the distance feature may also be useful.

To determine the distance between users, the difference in levels are counted. For example, each level difference may be counted as 1. For example, if two users are two levels apart, the distance may be equal to 2. Other techniques for determining distance of relationship between users may also be useful.

Figure 9:
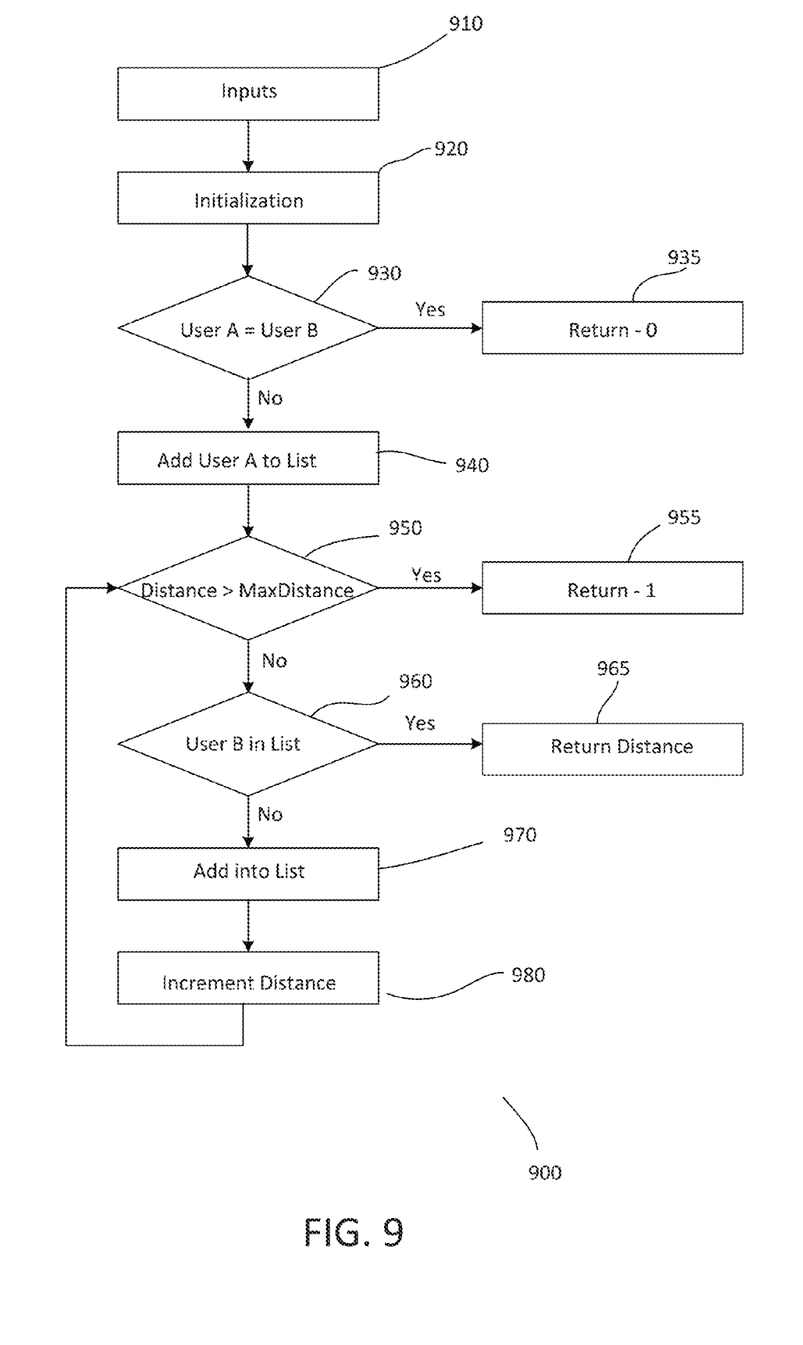
FIG. 9 shows a flow diagram of a process or routine for determining a distance of relationship between two users.

FIG. 9 shows a flow diagram of a process or routine 900 for determining a distance of relationship between any two users, such as User A and User B. The user's need not be members of the friendList. At step 910, when the distance feature is initiated, the user may provide inputs. In one implementation, the inputs include first and second users (User A and User B) and the threshold or maximum distance (Maxdistance) of the relationship between the users. The routine is initialized at step 920. Initialization, in one implementation, includes initializing the distance value (Distance) to equal to 0. At step 930, the routine determines if the two users (User A and User B) are the same. If User A=User B, the routine returns a distance value of 0 (Distance=0) at step 935 and terminates. When Distance=0 is returned, this indicates that the two users are the same. On the other hand, if the users are not the same, the routine proceeds to step 940.

At step 940, the routine adds user A to the friends list (e.g., friendList). The routine includes a loop between steps 950 to 980. At step 950, the loop begins by comparing Distance with Maxdistance. If Distance is greater than Maxdistance, the routine returns Distance=−1 at step 955 and terminates. When Distance=−1 is returned, this indicates that the distance between User A and User B exceeds the threshold. In the case Distance is not greater than Maxdistance, the routine proceeds to step 960 to determine if User B is in the friendList. If User B is in the friendList, the routine returns Distance at step 965 and terminates. The value of Distance indicates the distance between the users. If User B is not in the list, the routine proceeds to step 970. At step 970, the routine retrieves the next level friends. The routine adds unique friends in the next level to the friendList which are not common to any friends already in the friendList. At step 980, Distance is incremented by the routine and returns to step 950, which is the beginning of the loop. The process continues until User B is found and returns the Distance which indicates the distance between the users or Maxdistance is exceeded.

As an example, User A is the owner of the account, User B is a third level friend of User A and Maxdistance is equal to 3. Using this routine, the loop is performed three times, after which Distance=3 is returned. On the other hand, if User B is a fourth level friend of User A and Maxdistance is equal to 3, the routine returns a Distance=−1, indicating that User B exceeds the threshold distance Maxdistance. Other processes for determining distance may also be useful.

An example of a pseudo code for a distance determination routine is provided as follows:

```
Int getDistance (User userA, User userB, int maxDistance){
    Int distance=0;
    if(userA == userB)
        return 0;
    UserList friendList = new UserList( );
```

```
    friendList.add(userA);
    while(true){
        if(distance> maxDistance)
            return −1;
        UserList nextLevelFriends = new nextLevelFriends( )
        foreach(User user in friendList){
            if(user == userB)
                return distance;
            nextLevelFriends.add(user.friends);
        }
        friendList.add(nextLevelFriends);
        distance++;
    }
}
```

As described, the multi-level entities module may be embodied as an application. For example, multi-level entities module may be embodied as a software application. The multi-level entities module application may be integrated into an existing software application, such as a social media application, as an add-on or plug-in to an existing application, or as a separate stand-alone application. The existing software application may be a suite of software applications. The source code of the application may be compiled to create an executable code. The codes, for example, may be stored in a storage medium, such as one or more storage disks. Other types of storage media may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method for customizing multiple levels of relationships between entities in a social media network, comprising:
   posting content by a plurality of entities in a social media network, wherein the entities correspond to users of the social media network;
   defining n number of levels of entities related to a user of the social media network with a multi-level entities module, wherein an entity comprises an individual person who is a subscriber of the social media network;
   determining, by the multi-level entities module, a list of entities in relationship to the user defined by direct and indirect relationships to the user from levels 1 to n, wherein
   level 1 includes at least one level 1 entity, each level 1 entity has a direct relationship to the user, wherein the direct relationship is a friend of the user in the social media network,
   an $i^{th}$ level includes at least one level i entity, where i is from 1 to n, wherein each level i entity has a direct relationship with at least one level i minus 1 level entity, the level i direct relationship is a friend of the previous higher level (i minus 1) entity,
   each entity in levels 2 to n has an indirect relationship to the user, wherein the indirect relationship from level 1 to n is a relationship to the user through a friend of a friend, and
   wherein the multi-level module receives, from the user, a selection of a level n greater than 1; and
   displaying the entities list to the user and the posted content of all the entities having an indirect relationship to the user within the selected level n.

2. The computer-implemented method of claim 1 comprising displaying the entities list in a display panel of the social media network, wherein entities related to the user is displayed with an indication of the level they belong.

3. The computer-implemented method of claim 2 wherein the entities in the entities list are displayed graphically with an indication of relationship to the user and level they belong.

4. The computer-implemented method of claim 2 wherein the entities in the entities list are displayed in a tree structure.

5. The computer-implemented method of claim 1 wherein entities further comprise groups of people.

6. The computer-implemented method of claim 1 wherein the entities list provides a list of unique entities in relationship to the user from succeeding levels by removing common entities.

7. The computer implemented method of claim 1 wherein determining the n levels of entities by the multi-level entities module comprises:
   providing the user and n to the multi-level entities module; and
   iteratively retrieving the n levels of entities, wherein iteratively retrieving comprises performing the following steps repeatedly if n>0
   (i) retrieving next level of entities,
   (ii) adding the next level of entities to the entities list, and
   (iii) decrementing n and return to step (i) until n=0.

8. The computer-implemented method of claim 1 comprising displaying content of entities in the entities list in a page of the social media network.

9. The computer-implemented method of claim 1 comprising filtering to selectively display content of selected entities from the entities list.

10. The computer-implemented method of claim 9 wherein filtering comprises level reduction filtering, the level reduction filtering comprising removing entities displayed according to different percentages across different levels, wherein direct relationships have a highest percentage and indirect relationships have percentages that decrease as the level increases.

11. The computer-implemented method of claim 9 wherein filtering comprises tag filtering, wherein tag filtering displays selected entities tagged with a desired tag.

12. A social media network comprising:
   a server containing the social media network, wherein a plurality of entities post content in the social media network, and wherein the entities correspond to users of the social media network;
   a database containing the users of the social media network, the database includes a table with a user column for users and a direct entities column containing entities in direct relationship to the users, wherein an entity comprises an individual person who is a subscriber of the social media network;
   a multi-level entities module, wherein the multi-level entities module:
      generates an entities list of a user containing n levels of entities in relationship to the user, wherein the relationship is defined by direct and indirect relationships to the user, wherein
         level 1 includes at least one level 1 entity, each level 1 entity has a direct relationship to the user, wherein the direct relationship is a friend of the user in the social media network,
         an $i^{th}$ level includes at least one level I entity, where i is from 1 to n, wherein each level i entity has a direct relationship with at least one level i minus 1 level entity, the level i direct relationship is a friend of the previous higher level (i minus 1) entity, and
         each entity in levels 2 to n has an indirect relationship to the user, wherein the indirect relationship from level 1 to n is a relationship to the user through a friend of a friend, and
      wherein the multi-level module receives, from the user, a selection of a level n greater than 1; and
      displays the entities list to the user and the posted content of all the entities having an indirect relationship to the user within the selected level n.

13. The social media network of claim 12 comprising a display unit for displaying the entities list in a display panel, wherein entities in relationship to the user are displayed with an indication of the level they belong.

14. The social media network of claim 12 wherein
   the multi-level entities module comprises a default n value for the number of levels; and
   a level selector, the level selector enables the user to define n which overrides the default n value.

15. The social media network of claim 12 wherein the entities module generates the entities list level-by-level, until the entities list contains n levels of entities.

16. The social media network of claim 12 comprising a filtering unit, the filtering unit selectively displays content of selected entities from the entities list.

17. The social media network of claim 16 wherein the filtering unit comprises a level reduction filter.

\* \* \* \* \*